United States Patent
Singh et al.

(10) Patent No.: US 11,392,845 B2
(45) Date of Patent: Jul. 19, 2022

(54) METHOD AND SYSTEM FOR MULTI-CORE PROCESSING BASED TIME SERIES MANAGEMENT WITH PATTERN DETECTION BASED FORECASTING

(71) Applicant: Tata Consultancy Services Limited, Mumbai (IN)

(72) Inventors: Brajesh Singh, Mumbai (IN); Sachin Shetty, Mumbai (IN)

(73) Assignee: TATA CONSULTANCY SERVICES LIMITED MUMBAI, Mumbai (IN)

(*) Notice: Subject to any disclaimer, the term of this patent is extended or adjusted under 35 U.S.C. 154(b) by 1192 days.

(21) Appl. No.: 15/898,109

(22) Filed: Feb. 15, 2018

(65) Prior Publication Data
US 2019/0130293 A1    May 2, 2019

(30) Foreign Application Priority Data
Oct. 31, 2017    (IN) .............. 201721038701

(51) Int. Cl.
| | | |
|---|---|---|
| *G06N 5/04* | (2006.01) | |
| *G06F 7/22* | (2006.01) | |
| *G06F 17/18* | (2006.01) | |
| *G06F 16/242* | (2019.01) | |
| *G06Q 10/06* | (2012.01) | |
| *G06Q 10/04* | (2012.01) | |

(52) U.S. Cl.
CPC .............. *G06N 5/047* (2013.01); *G06F 7/22* (2013.01); *G06F 16/2433* (2019.01); *G06F 17/18* (2013.01); *G06Q 10/04* (2013.01); *G06Q 10/063* (2013.01)

(58) Field of Classification Search
CPC ....... G06N 5/047; G06F 16/2433; G06F 7/22; G06F 17/18; G06Q 10/04; G06Q 10/063
See application file for complete search history.

(56) References Cited

U.S. PATENT DOCUMENTS

| | | | |
|---|---|---|---|
| 7,562,062 B2 | 7/2009 | Ladde et al. | |
| 7,739,143 B1 | 6/2010 | Dwarakanath et al. | |
| 7,987,106 B1* | 7/2011 | Aykin ................. | G06Q 10/063 705/7.11 |
| 8,001,093 B2 | 8/2011 | Neogi et al. | |
| 8,112,302 B1 | 2/2012 | Trovero et al. | |
| 8,676,630 B2 | 3/2014 | Grichnik et al. | |
| 8,781,919 B2 | 7/2014 | Danesi et al. | |
| 9,418,339 B1 | 8/2016 | Leonard et al. | |
| 2011/0040773 A1* | 2/2011 | Danesi ................... | G06F 16/10 707/756 |

(Continued)

Primary Examiner — Casey R. Garner
(74) Attorney, Agent, or Firm — Finnegan, Henderson, Farabow, Garrett & Dunner LLP

(57) ABSTRACT

System and method for multi-core processing based time series management, capable of handling high volume time series data with high speed processing for time series forecasting. The method includes storing each time series as a Structured Query Language (SQL) array in a single row using a plurality of time series parameters. Further, stored plurality of time series are analyzed on receiving a forecast request using a correlation based pattern detection mechanism. The pattern detection mechanism enables deriving a subset of forecasting models, from which an optimal or best-fit forecasting model is identified to generate one or more forecasted time series.

18 Claims, 10 Drawing Sheets

(56) References Cited

U.S. PATENT DOCUMENTS

| | | | |
|---|---|---|---|
| 2015/0095381 A1* | 4/2015 | Chen | G06F 16/13 |
| | | | 707/803 |
| 2016/0005055 A1 | 1/2016 | Sarferaz | |
| 2016/0342909 A1* | 11/2016 | Chu | G06Q 10/063 |
| 2017/0364614 A1* | 12/2017 | Freeman | G06F 30/20 |
| 2018/0136994 A1* | 5/2018 | Toledano | G06F 11/322 |

* cited by examiner

| Product | Store | Date of Invoice | InvoiceQty | | |
|---|---|---|---|---|---|
| AB01DE00001 | ST02K001 | 1-Jan-14 | 12 | | |
| AB01DE00001 | ST02K001 | 1-Feb-14 | 43 | | |
| AB01DE00001 | ST02K001 | 1-Mar-14 | 86 | | |
| AB01DE00001 | ST02K001 | 1-Apr-14 | 14 | | |
| AB01DE00001 | ST02K001 | 1-May-14 | 62 | | |
| AB01DE00001 | ST02K001 | 1-Jun-14 | 27 | | |
| AB01DE00001 | ST02K001 | 1-Jul-14 | 46 | | |
| AB01DE00001 | ST02K001 | 1-Aug-14 | 15 | Freq 12 | |
| AB01DE00001 | ST02K001 | 1-Sep-14 | 36 | | |
| AB01DE00001 | ST02K001 | 1-Oct-14 | 16 | | Store1 Product1 |
| AB01DE00001 | ST02K001 | 1-Nov-14 | 71 | | |
| AB01DE00001 | ST02K001 | 1-Dec-14 | 34 | | |
| AB01DE00001 | ST02K001 | 1-Jan-15 | 66 | | |
| AB01DE00001 | ST02K001 | 1-Feb-15 | 100 | | |
| AB01DE00001 | ST02K001 | 1-Mar-15 | 92 | | For 2+ yrs Datapoints 26 |
| AB01DE00001 | ST02K001 | 1-Apr-15 | 79 | | |
| AB01DE00001 | ST02K001 | 1-May-15 | 100 | | |
| AB01DE00001 | ST02K001 | 1-Jun-15 | 16 | | |
| AB01DE00001 | ST02K001 | 1-Jul-15 | 57 | | |
| AB01DE00001 | ST02K001 | 1-Aug-15 | 87 | Freq 12 | |
| AB01DE00001 | ST02K001 | 1-Sep-15 | 22 | | |
| AB01DE00001 | ST02K001 | 1-Oct-15 | 10 | | |
| AB01DE00001 | ST02K001 | 1-Nov-15 | 33 | | |
| AB01DE00001 | ST02K001 | 1-Dec-15 | 49 | | |
| AB01DE00001 | ST02K001 | 1-Jan-16 | 59 | 2 | |
| AB01DE00001 | ST02K001 | 1-Feb-16 | 22 | | |
| AB01DE00002 | ST02K001 | 1-Jan-14 | 179 | | |
| AB01DE00002 | ST02K001 | 1-Feb-14 | 198 | | |
| AB01DE00002 | ST02K001 | 1-Mar-14 | 65 | | |
| AB01DE00002 | ST02K001 | 1-Apr-14 | 425 | | |
| AB01DE00002 | ST02K001 | 1-May-14 | 138 | | |
| AB01DE00002 | ST02K001 | 1-Jun-14 | 275 | | |
| AB01DE00002 | ST02K001 | 1-Jul-14 | 39 | | |
| AB01DE00002 | ST02K001 | 1-Aug-14 | 112 | Freq 12 | |
| AB01DE00002 | ST02K001 | 1-Sep-14 | 123 | | |
| AB01DE00002 | ST02K001 | 1-Oct-14 | 60 | | Store2 Product1 |
| AB01DE00002 | ST02K001 | 1-Nov-14 | 216 | | |
| AB01DE00002 | ST02K001 | 1-Dec-14 | 232 | | |
| AB01DE00002 | ST02K001 | 1-Jan-15 | 274 | | |
| AB01DE00002 | ST02K001 | 1-Feb-15 | 36 | | |
| AB01DE00002 | ST02K001 | 1-Mar-15 | 467 | | |
| AB01DE00002 | ST02K001 | 1-Apr-15 | 121 | | For 2+ yrs Datapoints 26 |
| AB01DE00002 | ST02K001 | 1-May-15 | 272 | | |
| AB01DE00002 | ST02K001 | 1-Jun-15 | 234 | | |
| AB01DE00002 | ST02K001 | 1-Jul-15 | 218 | | |
| AB01DE00002 | ST02K001 | 1-Aug-15 | 109 | Freq 12 | |
| AB01DE00002 | ST02K001 | 1-Sep-15 | 325 | | |
| AB01DE00002 | ST02K001 | 1-Oct-15 | 276 | | |
| AB01DE00002 | ST02K001 | 1-Nov-15 | 233 | | |
| AB01DE00002 | ST02K001 | 1-Dec-15 | 401 | | |
| AB01DE00002 | ST02K001 | 1-Jan-16 | 376 | 2 | |
| AB01DE00002 | ST02K001 | 1-Feb-16 | 393 | | |

FIG. 5a

| | | | |
|---|---|---|---|
| AB01DE00001 | ST02K002 | 1-Jan-14 | 40 |
| AB01DE00001 | ST02K002 | 1-Feb-14 | 27 |
| AB01DE00001 | ST02K002 | 1-Mar-14 | 10 |
| AB01DE00001 | ST02K002 | 1-Apr-14 | 19 |
| AB01DE00001 | ST02K002 | 1-May-14 | 27 |
| AB01DE00001 | ST02K002 | 1-Jun-14 | 36 |
| AB01DE00001 | ST02K002 | 1-Jul-14 | 10 |
| AB01DE00001 | ST02K002 | 1-Aug-14 | 25 |
| AB01DE00001 | ST02K002 | 1-Sep-14 | 14 |
| AB01DE00001 | ST02K002 | 1-Oct-14 | 17 |
| AB01DE00001 | ST02K002 | 1-Nov-14 | 24 |
| AB01DE00001 | ST02K002 | 1-Dec-14 | 36 |
| AB01DE00001 | ST02K002 | 1-Jan-15 | 26 |
| AB01DE00001 | ST02K002 | 1-Feb-15 | 34 |
| AB01DE00001 | ST02K002 | 1-Mar-15 | 14 |
| AB01DE00001 | ST02K002 | 1-Apr-15 | 21 |
| AB01DE00001 | ST02K002 | 1-May-15 | 14 |
| AB01DE00001 | ST02K002 | 1-Jun-15 | 16 |
| AB01DE00001 | ST02K002 | 1-Jul-15 | 11 |
| AB01DE00001 | ST02K002 | 1-Aug-15 | 33 |
| AB01DE00001 | ST02K002 | 1-Sep-15 | 34 |
| AB01DE00001 | ST02K002 | 1-Oct-15 | 20 |
| AB01DE00001 | ST02K002 | 1-Nov-15 | 25 |
| AB01DE00001 | ST02K002 | 1-Dec-15 | 13 |
| AB01DE00001 | ST02K002 | 1-Jan-16 | 35 |
| AB01DE00001 | ST02K002 | 1-Feb-16 | 23 |
| AB01DE00001 | ST02K003 | 1-Jan-14 | 13 |
| AB01DE00001 | ST02K003 | 1-Feb-14 | 73 |
| AB01DE00001 | ST02K003 | 1-Mar-14 | 72 |
| AB01DE00001 | ST02K003 | 1-Apr-14 | 67 |
| AB01DE00001 | ST02K003 | 1-May-14 | 70 |
| AB01DE00001 | ST02K003 | 1-Jun-14 | 30 |
| AB01DE00001 | ST02K003 | 1-Jul-14 | 65 |
| AB01DE00001 | ST02K003 | 1-Aug-14 | 29 |
| AB01DE00001 | ST02K003 | 1-Sep-14 | 44 |
| AB01DE00001 | ST02K003 | 1-Oct-14 | 62 |
| AB01DE00001 | ST02K003 | 1-Nov-14 | 27 |
| AB01DE00001 | ST02K003 | 1-Dec-14 | 61 |
| AB01DE00001 | ST02K003 | 1-Jan-15 | 63 |
| AB01DE00001 | ST02K003 | 1-Feb-15 | 64 |
| AB01DE00001 | ST02K003 | 1-Mar-15 | 46 |
| AB01DE00001 | ST02K003 | 1-Apr-15 | 33 |
| AB01DE00001 | ST02K003 | 1-May-15 | 45 |
| AB01DE00001 | ST02K003 | 1-Jun-15 | 21 |
| AB01DE00001 | ST02K003 | 1-Jul-15 | 42 |
| AB01DE00001 | ST02K003 | 1-Aug-15 | 60 |
| AB01DE00001 | ST02K003 | 1-Sep-15 | 32 |
| AB01DE00001 | ST02K003 | 1-Oct-15 | 79 |
| AB01DE00001 | ST02K003 | 1-Nov-15 | 23 |
| AB01DE00001 | ST02K003 | 1-Dec-15 | 36 |
| AB01DE00001 | ST02K003 | 1-Jan-16 | 66 |
| AB01DE00001 | ST02K003 | 1-Feb-16 | 74 |

Store1 Product2 — Freq 12, For 2+ yrs Datapoints 26, Freq 12, 2

Store1 Product3 — Freq 12, For 2+ yrs Datapoints 26, Freq 12, 2

FIG. 5b 26 row storage per time series, total number of rows to be processes=105

| Dimension | Value |
|---|---|
| Frequency | 12 |
| # Of data points | 26 |
| # Of years | 2+ |
| # of Products | 2 |
| # of Stores | 3 |
| Total Rows to be processed: | 105 |

FIG. 5c

Single row storage per time series, total number of rows to be processed = 5

| Product | Store | Start Date | Freq | Quantities |
|---|---|---|---|---|
| AB01DE00001 | ST02K001 | 1-Jan-14 | 12 | 12,43,86,14,62,27,46,15,36,16,71,34,66,100,92,79,100,16,57,87,22,10,33,49,59,22 |
| AB01DE00002 | ST02K001 | 1-Jan-14 | 12 | 179,198,65,425,138,275,39,112,123,60,216,232,274,36,467,121,272,234,218,109,325,276,233,401,376,393 |
| AB01DE00001 | ST02K002 | 1-Jan-14 | 12 | 40,27,10,19,27,36,10,25,14,17,24,36,26,34,14,21,14,16,11,33,34,20,25,13,35,23 |
| AB01DE00001 | ST02K003 | 1-Jan-14 | 12 | 13,73,72,67,70,30,65,29,44,62,27,61,63,64,46,33,45,21,42,60,32,79,23,36,66,74 |

FIG. 5d

Total sales across all stores and products

| Company | Start Date | Frequency | Quantities |
|---|---|---|---|
| ABC | 1-Jan-14 | 12 | 244,341,233,525,297,368,160,181,217,155,338,363,429,234,619,254,431,287,328,289,413,385,314,499,536,512 |

Product 1 Total sales across all stores

| Product | Start Date | Frequency | Quantities |
|---|---|---|---|
| AB01DE00001 | 1-Jan-14 | 12 | 65,143,168,100,159,93,121,69,94,95,122,131,155,198,152,133,159,53,110,180,88,109,81,98,160,119 |

Product 2 Total sales across all stores

| Product | Start Date | Frequency | Quantities |
|---|---|---|---|
| AB01DE00002 | 1-Jan-14 | 12 | 179,198,65,425,138,275,39,112,123,60,216,232,274,36,467,121,272,234,218,109,325,276,233,401,376,393 |

Store1 1 Total sales across all products

| Store | Start Date | Frequency | Quantities |
|---|---|---|---|
| ST02K001 | 1-Jan-14 | 12 | 191,241,151,439,200,302,85,127,159,76,287,266,340,136,559,200,372,250,275,196,347,286,266,450,435,415 |

Store2 1 Total sales across all products

| Store | Start Date | Frequency | Quantities |
|---|---|---|---|
| ST02K002 | 1-Jan-14 | 12 | 40,27,10,19,27,36,10,25,14,17,24,36,26,34,14,21,14,16,11,33,34,20,25,13,35,23 |

Store3 1 Total sales across all products

| Store | Start Date | Frequency | Quantities |
|---|---|---|---|
| ST02K003 | 1-Jan-14 | 12 | 13,73,72,67,70,30,65,29,44,62,27,61,63,64,46,33,45,21,42,60,32,79,23,36,66,74 |

Year Wise Total sales by Product and Stores

| Product | Location | Start Date | Frequency | Quantities |
|---|---|---|---|---|
| AB01DE00001 | ST02K001 | 1-Jan-14 | 1 | 462,711,81 |
| AB01DE00002 | ST02K001 | 2-Jan-14 | 1 | 2062, 2966, 759 |
| AB01DE00001 | ST02K002 | 3-Jan-14 | 1 | 285, 261, 58 |
| AB01DE00001 | ST02K003 | 4-Jan-14 | 1 | 613, 544, 140 |

FIG. 5e

METHOD AND SYSTEM FOR MULTI-CORE PROCESSING BASED TIME SERIES MANAGEMENT WITH PATTERN DETECTION BASED FORECASTING

CROSS-REFERENCE TO RELATED APPLICATIONS AND PRIORITY

This application takes priority from the Indian filed application no. 201721038701 filed on 31 Oct. 2017, the entirety of which is hereby incorporated by reference.

DESCRIPTION

TECHNICAL FIELD

The disclosure herein generally relates to field of time series and, more particularly, to data management and pattern detection based forecasting of the time series.

BACKGROUND

Time series analysis and forecasting enables quantitative analysis of a time series recorded over time. The time series is a data with a time dimension added to observations being recorded. The time dimension adds a constraint and a structure that provides a source of additional information related to the data or observations being recorded over time. Time series forecasting enables predicting future trends with respect to the observations being recorded. Typical applications of time series forecasting include predicting growth of key business activities, for instance the rise and fall of stock prices, determining market trends amongst others and the like. The time series analysis can also be applied in Information Technology (IT), where the time series corresponds to data associated with monitored hardware and/or software. Thus, analysis of such time series enables building historical behavior of the IT infrastructure to predict future behavior of IT resources, providing insight on when and how said hardware or software resource will require upgrading or substitution.

A multitude of time series forecasting methods exists, which follow general steps comprising accessing a time series from a data source, preprocessing the time series, applying pattern matching techniques to select a model for forecasting the preprocessed time series and forecasting the time series utilizing the selected model. As can be understood, time series data is a high volume data and storing and accessing such high volume of data is critical for faster and efficient time series analysis and forecasting. Traditionally, storing of time series historical data in the DB utilizes at least two column structure with a column for date/time of recording a parameter and another column storing corresponding value of the parameter being recorded. There may be additional columns to qualify a series, like say, if the time series depicted sales, the other columns may be that representing a product ID and store ID. However, multitude of time series are being read in and written to the database, which creates a huge storage and processing pressure on the database. Some existing methods address issue of storing huge volume of data corresponding to the time series, however the existing methods propose a new database management systems as compared to a Structured Query Language (SQL) database, which is used extensively. This requires changes to an existing system, which does not provide a cost efficient solution. Some existing methods provide solutions of handling the huge volume of data in memory but to fail to address memory size issue for data storage. Some existing methods aggregate and store the huge data, however special data reading techniques need to be applied for such aggregated data rather that simple SQL queries, which a regular user is familiar with.

Further, existing pattern matching techniques, which are utilized to select a best fit forecasting model, often analyze trend property or seasonality property of the time series independently, or, loop over each possibility to find the best fit, which provides slower convergence of the forecast model for the time series analyzed and need high performing hardware to converge faster. This requires, updating of the existing system, which is not a cost efficient solution. However, best-fit model selection needs to converge faster than the current method of trying through all possible combinations and picking one with best accuracy. Hence, existing pattern matching techniques fail to provide time efficient and cost efficient solutions for time series forecasting, where volume of data is tremendous while analyzing multitude of time series.

Further, existing systems while handling missing value and outlier correction are unable to utilize the inherent trend, seasonal properties and their interactions, thereby resulting in less accurate treatment for missing values and outlier corrections.

SUMMARY

Embodiments of the present disclosure present technological improvements as solutions to one or more of the above-mentioned technical problems recognized by the inventors in conventional systems. For example, in one embodiment, a method for providing multi-core processing based time series management with pattern detection based forecasting is described. The method comprises receiving a plurality of time series from a plurality of data sources and storing the time series as a Structured Query Language (SQL) array in a SQL database. Further, the method comprises analyzing the stored plurality of time series on receiving a forecast request. The analysis is performed to identify at least one of a seasonal frequency, a trend property and a seasonality property using a correlation based pattern detection mechanism. The pattern detection mechanism is based on generating a mean series, a seasonal-difference series, a seasonal-ratio series, a trend-difference series and a trend-ratio series for each series among the stored plurality of time series. Further, the method comprises treating the stored plurality of time series by applying at least one of missing value corrections and outlier corrections. Furthermore, the method comprises deriving a subset of forecasting models from a plurality of pre-stored forecasting models based on at least one of the seasonal frequency, the trend property, the seasonality property, and the plurality of treated time series, wherein a forecasting model for time series forecasting is selected from the subset.

A system for providing multi-core processing based time series management with pattern detection based forecasting is described. The, system comprises a memory operatively coupled to one or more hardware processors and configured to store instructions configured for execution by the one or more hardware processors. Further, the system comprises a time series management module configured to receive a plurality of time series from a plurality of data sources and storing the time series as a Structured Query Language (SQL) array in a SQL database. Further, the time series management module is configured to analyze the stored plurality of time series on receiving a forecast request. The analysis is performed to identify at least one of a seasonal frequency, a trend property and a seasonality property using a correlation based pattern detection mechanism. The pattern detection mechanism is based on generating a mean series, a seasonal-difference series, a seasonal-ratio series, a trend-difference series and a trend-ratio series for each series among the stored plurality of time series. Further, the time series management module is configured to treat the stored plurality of time series by applying at least one of missing value corrections and outlier corrections. Furthermore, the time series management module is configured derive a subset of forecasting models from a plurality of pre-stored forecasting models based on at least one of the seasonal frequency, the trend property, the seasonality property, and the plurality of treated time series, wherein a forecasting model for time series forecasting is selected from the subset.

In yet another aspect, a non-transitory computer readable medium is provided. The non-transitory computer-readable medium storing instructions, which, when executed by a hardware processor, cause the hardware processor to perform steps comprising receiving a plurality of time series from a plurality of data sources and storing the time series as a Structured Query Language (SQL) array in a SQL database. Further, the step comprises analyzing the stored plurality of time series on receiving a forecast request. The analysis is performed to identify at least one of a seasonal frequency, a trend property and a seasonality property using a correlation based pattern detection mechanism. The pattern detection mechanism is based on generating a mean series, a seasonal-difference series, a seasonal-ratio series, a trend-difference series and a trend-ratio series for each series among the stored plurality of time series. Further, the step comprises treating the stored plurality of time series by applying at least one of missing value corrections and outlier corrections. Furthermore, the step comprises deriving a subset of forecasting models from a plurality of pre-stored forecasting models based on at least one of the seasonal frequency, the trend property, the seasonality property, and the plurality of treated time series, wherein a forecasting model for time series forecasting is selected from the subset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 5a through 5j illustrate the multi-core processing based time series management with pattern detection based forecasting utilizing example time series, in accordance with some embodiments of the present disclosure.

Figure 1:
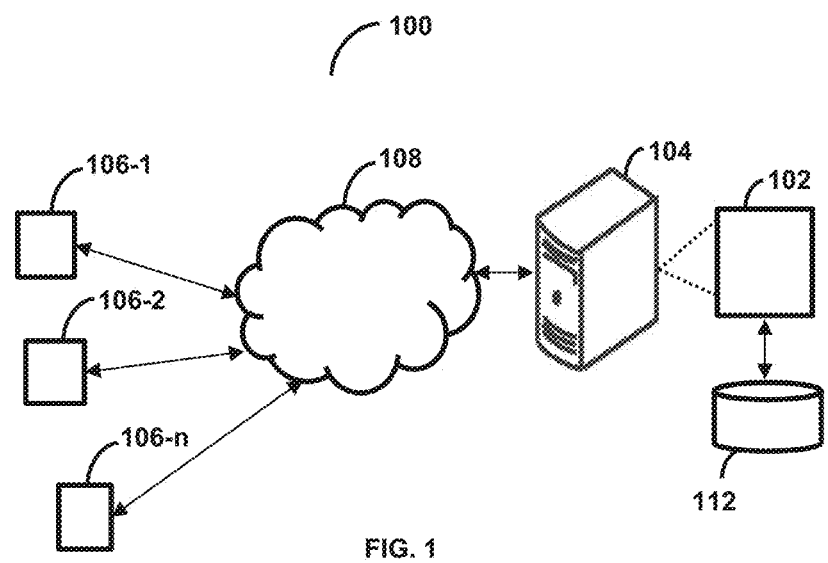
FIG. 1 illustrates an example network environment implementing a time series management system providing a multi-core processing based time series management with pattern detection based forecasting, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system for multi-core processing based time series management, capable of handling high volume time series data with high speed processing for time series forecasting. The method includes, receiving a plurality of time series from a plurality of data sources and storing the time series as a Structured Query Language (SQL) array in a SQL database or the like. Each time series among the plurality of time series is stored in a single row using a plurality of time series parameters. The single row requirement per time series provides a compact storage format, providing memory resource efficient solution for storing high volume data associated with multitude of time series being recorded. Further, the stored time series can be read using the SQL database queries, well known to a general user. Moreover, it is also faster to read and write a single row, than hundreds of rows to get information about a single series. Thus, the method proposed provides an efficient high volume data storage with existing database systems, easily implemented without need for upgrading existing systems. Further, the single row format can be read to for providing customized data requested by the user by providing an aggregator component built on top of the database. The aggregator can perform in-memory operations to still achieve higher throughput than traditional database designs for storing and managing time series.

Once the time series data is stored, the method includes analyzing the stored plurality of time series on receiving a forecast request from the user. The analysis is performed to provide at least one of a seasonal frequency, a trend property and a seasonality property. The analysis utilizes a correlation based pattern detection mechanism to identify the properties. The pattern detection mechanism proposed is based on generating a mean series, a seasonal-difference series and a seasonal-ratio series for each series among the stored plurality of time series. Further, the for any missing values or outliers present in the stored time series, the method includes applying missing value corrections and outlier corrections to the stored plurality of time series. The missing value corrections and outlier corrections utilize the seasonal frequency, the trend property and the seasonality property obtained from the analyzed plurality of time series. Thus, post corrections the plurality of time series is updated to provide a plurality of treated time series.

The pattern detection mechanism provided enables cost efficient techniques to be used to pre-determine whether the trend property and the seasonality property exist in a time series being analyzed. Further, if the trend property and the seasonality property exist, the pattern detection mechanism proposed can identify whether it is additive or multiplicative in nature.

Further, the missing value interpolation (corrections) and outlier corrections provide due recognition to not just the underlying trend property and the seasonality property but also their additive or multiplicative nature of interaction. Thus, enabling to detect interrelation or interaction between the trend property and the seasonality property.

Further, in response to the forecast request the method includes identifying a forecasting model, for time swerie3s forecasting, from a subset of forecasting models to generate one or more forecasted time series in response to the forecast request. The method enables a faster convergence on identifying an optimal or best fit forecasting model as the method enables deriving the subset from a plurality of pre-stored forecasting models. The subset effectively reduces the comparisons for the optimal forecasting model selection to only the identified subset rather than comparing with larger number of the pre-stored forecasting models. The subset is derived based on the seasonal frequency, the detected trend property, the detected seasonality property and the updated plurality of time series.

The method includes utilizing multi-core processing for the time series storing, analyzing and identifying a forecasting model, which is an optimum or best fit forecasting model. The multi-core processing balances overheads involved in creating processes on multiple cores, distributing jobs to each processes and collating run results. Thus, multicore-processing effectively provides time efficient computation of high volume data of the multitude of time series being recorded.

Referring now to the drawings, and more particularly to FIG. through FIG. 5, where similar reference characters denote corresponding features consistently throughout the figures, there are shown preferred embodiments and these embodiments are described in the context of the following exemplary system and/or method.

FIG. 1 illustrates an example network environment 100, implementing a time series management system 102 (alternatively referred as system 102) providing a multi-core processing based time series management with pattern detection based forecasting, according to some embodiments of the present disclosure. The network environment 100 includes a plurality of data sources 106-1 through 106-*n* that are source of a plurality of time series, being recorded. The data sources 106-1 to 106-*n* may be connected to a computing device 104 through a network 108. The computing device 104 may include a time series management system 102 configured to provide the multi-core processing based time series management with pattern detection based forecasting. In an example embodiment the time series management system 102 may be in direct communication with the computing device 102, as depicted in FIG. 1. In an example embodiment, the time series management system 102 may be embodied in the computing device 102 (not shown).

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

In an embodiment, the computing device 104, which implements the time series management system 102 can be a hand-held device, a laptop or other portable computer, a tablet computer, a mobile phone, a PDA, a smartphone, and a desktop computer and the like. The time series management system 102 may also be implemented in a workstation, a mainframe computer, a server, and a network server. In an embodiment, the time series management system 102 may be coupled to a data repository, for example, a repository 112. The repository 112, such as the SQL data base or the like, may store the plurality of time series received from the plurality of data sources 106-1 through 106-*n* in a single row using the plurality of time series parameters comprising the start date/time, the frequency of value samples and the plurality of value samples of the plurality of time series corresponding to the frequency. Further, the repository 112 can also include a plurality of pre-stored forecasting models. The time series management system 102 is configured to identify the optimal forecasting model for forecasting one or more forecasted time series. The subset of forecasting models to generate one or more forecasted time series is derived from the forecasting models based on the seasonal frequency, the detected trend property, the detected seasonality property and the updated plurality of time series. Further, the repository 112 may also store intermediate data generated during the optimal forecasting model process and any other data. In an alternate embodiment, the data repository 112 may be internal to the time series management system 102. The components and functionalities of the time series management system 102 are described further in detail with reference to FIG. 2 and FIG. 4.

Figure 2:
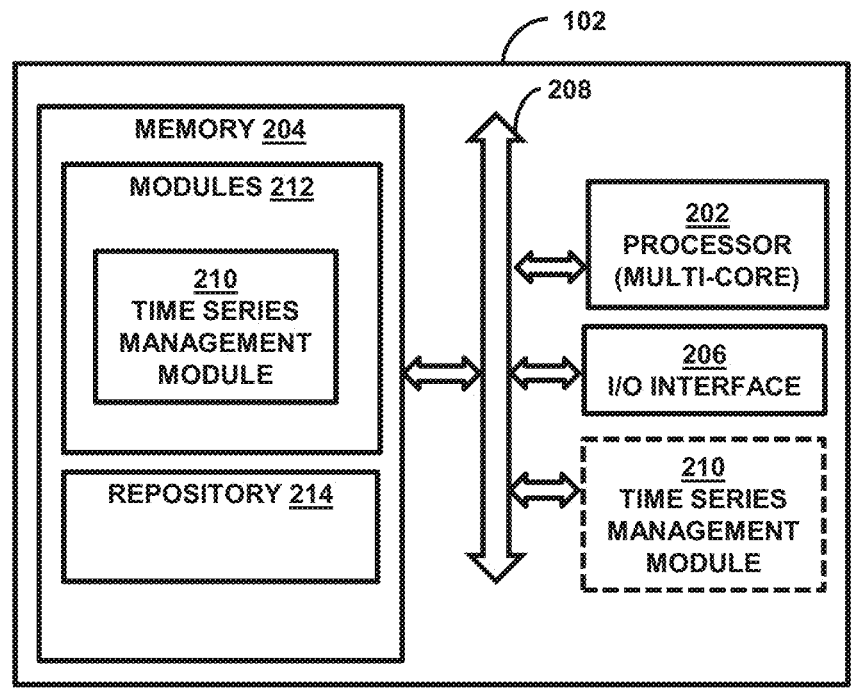
FIG. 2 is a functional block diagram of the time series management system, according to some embodiments of the present disclosure.

FIG. 2 is a functional block diagram of the time series management system 102, according to some embodiments of the present disclosure.

The time series management system 102 includes or is otherwise in communication with one or more hardware processors such as a processor 202, at least one memory such as a memory 204, and an I/O interface 206. The processor 202 (hardware processor), the memory 204, and the I/O interface 206 may be coupled by a system bus such as a system bus 208 or a similar mechanism. The time series management system 102 also includes a time series management module 210, wherein functions of the time series management module 210 are explained in conjunction with FIG. 4. In an embodiment, the time series management module 210 is a module among modules 212 of the memory 204. In an embodiment, the time series management module 210 can be an Integrated Circuit (IC), external to the memory 204, implemented using a Field-Programmable Gate Array (FPGA) or an Application-Specific Integrated Circuit (ASIC).

The hardware processor 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 204 and communicate with the time series management module 210, external to the memory 204, for triggering execution of functions to be implemented by the time series management module 210. A controller, reads the input workload to determine number of series to be forecasted.

The multicore processing approach implemented by the time series management system 102 includes detecting number of cores of the underlying physical system (processor 202) via Operating System Application Programming Interface (API) calls. Further, includes creating workers, as per number of available cores (or any configurable threshold) and the number of time series to be processed and distributing read information in specific memory blocks for each worker to operate on. Further, includes collating results for each of the workers and writing the result out in the memory 202 or to user end on a display. Thus, the multicore processing approach proposed enables faster computation, effectively providing time efficient time series forecasting, even for high volume data of the plurality of time series being recorded.

The I/O interface 206 may include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the time series management system 102 to communicate with other devices, such as the computing device 104, web servers and external databases (repository 112). The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes the plurality of modules 212 and a repository 214 for storing data processed, received, and generated by one or more of the modules 212. The modules 212 may include routines, programs, objects, components, data structures, and so on, which perform particular tasks or implement particular abstract data types. In an embodiment, the modules 212 may include the time series management module 210. The modules 212 may include computer-readable instructions that supplement applications or functions performed by the system 102.

The repository 214 may include the plurality of forecasting models and the subset of forecasting models, which are selected from the pre-stored forecasting models. Further, the repository 214 may hold data that is processed, received, or generated as a result of the execution of one or more modules 212.

Figure 3:
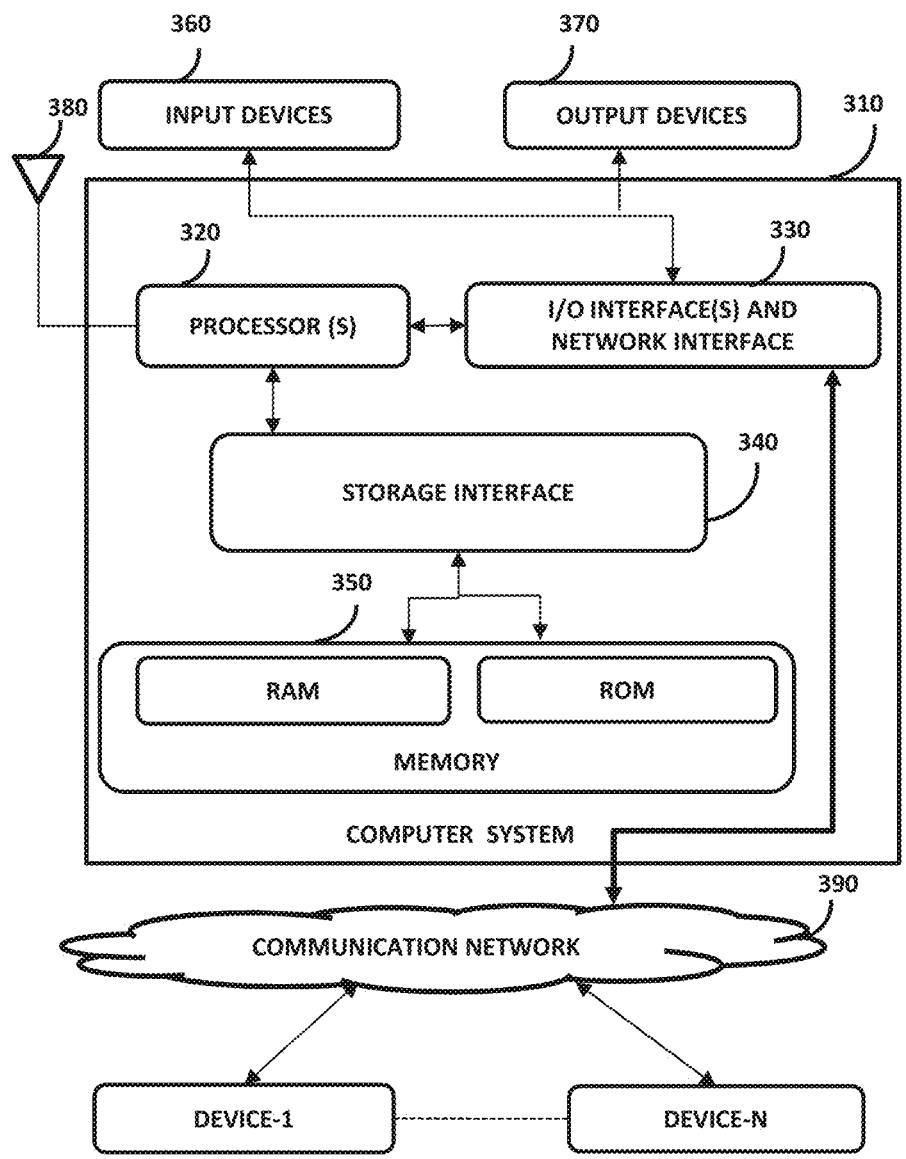
FIG. 3 illustrates a block diagram of an exemplary computer system for implementing the multi-core processing based time series management with pattern detection based forecasting, in accordance with some embodiments of the present disclosure.

Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments FIG. 3 illustrates a block diagram of an exemplary computer system 310 for implementing multi-core processing based time series management with pattern detection based forecasting, in accordance with some embodiments of the present disclosure.

Variations of computer system 310 may be used for implementing the embodiments of the decision support system 130 disclosed herein. The computer system 310 may comprise a central processing unit ("CPU" or "processor") 320. The processor 320 may comprise at least one data processor for executing program components for executing user- or system-generated requests. A user may include a person, a person using a device such as those included in this disclosure, or such a device itself. The processor 320 may include specialized processing units such as integrated system (bus) controllers, memory management control units, floating point units, graphics processing units, digital signal processing units, etc. The processor 320 may include a microprocessor, such as AMD Athlon, Duron or Opteron, ARM's application, embedded or secure processors, IBM PowerPC, Intel's Core, Itanium, Xeon, Celeron or other line of processors, etc. The processor 320 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 320 may be disposed in communication with one or more input/output (I/O) devices via I/O interface 330. The I/O interface 330 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 330, the computer system 310 may communicate with one or more I/O devices (360 and 370). For example, the input device 360 the may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like, stylus, scanner, storage device, transceiver, video device/source, visors, etc. The output devices 370 may be a printer, fax machine, video display (e.g., cathode ray tube (CRT), liquid crystal display (LCD), light-emitting diode (LED), plasma, or the like), audio speaker, etc. In some embodiments, a transceiver 380 may be disposed in connection with the processor 320. The transceiver 380 may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 320 may be disposed in communication with a communication network 390 via a network interface within the I/O interface 330. The network interface may communicate with the communication network 390. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 390 may include, without limitation, a direct interconnection, local area network (LAN), wide area network (WAN), wireless network (e.g., using Wireless Application Protocol), the Internet, etc. Using the network interface and the communication network 390, the computer system 310 may communicate with Device 1 through Device N. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 310 may itself embody one or more of these devices.

In some embodiments, the processor 320 may be disposed in communication with memory 350 comprising one or more memory devices (e.g., RAM 313, ROM 314, etc.) via a storage interface 340. The storage interface 340 may connect to the memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing the databases or other memories disclosed herein.

The memory devices may store a collection of program or database components, including, without limitation, an operating system, user interface application, web browser, mail server, mail client, user/application data (e.g., any data variables or data records discussed in this disclosure), etc. The operating system may facilitate resource management and operation of the computer system 310. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. The user interface may facilitate display, execution, interaction, manipulation, or operation of program components through textual or graphical facilities. For example, user interfaces may provide computer interaction interface elements on a display system operatively connected to the computer system 310, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 310 may implement a web browser stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 310 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 310 may store the plurality time series, user/application data, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Figure 4:
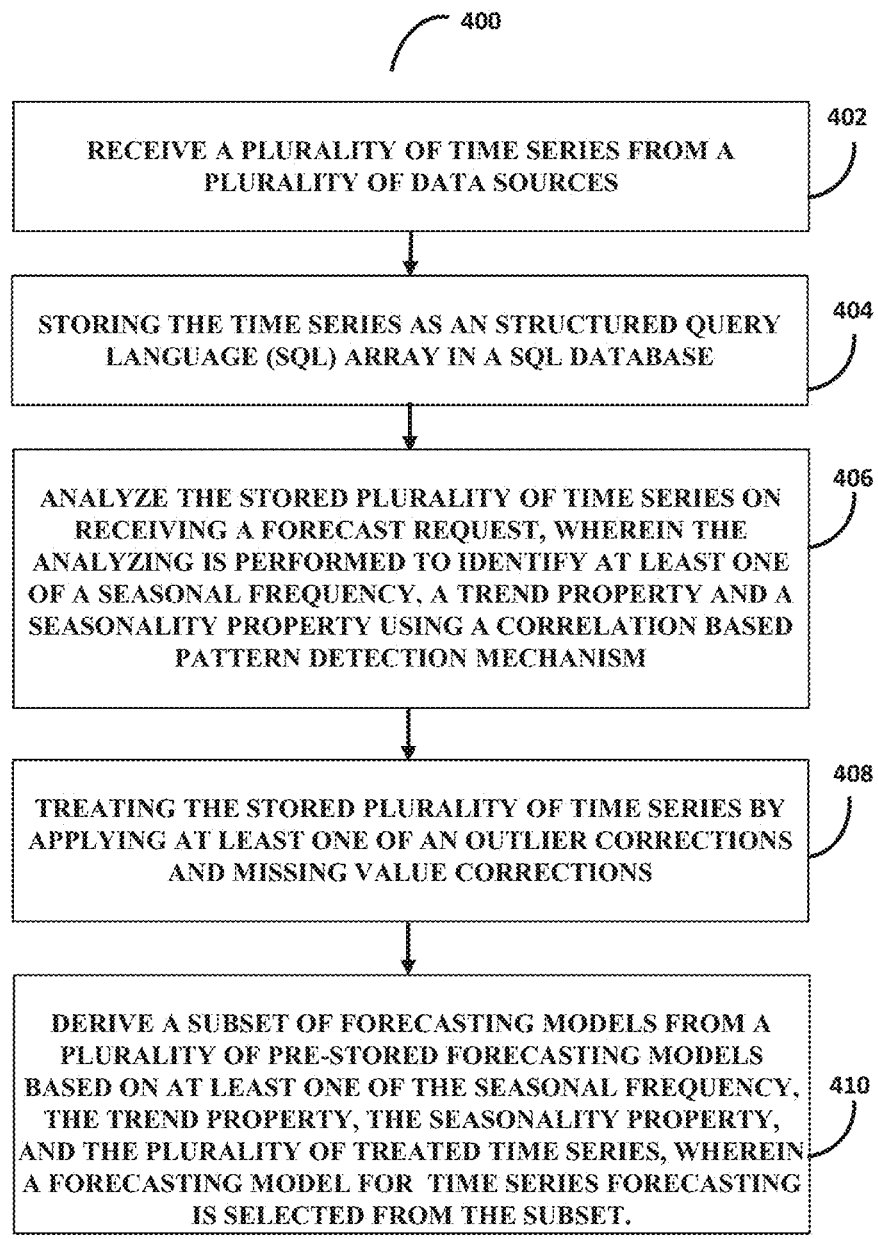
FIG. 4 is a flow diagram illustrating a method for the multi-processing based time series management with pattern detection based forecasting, in accordance with some embodiments of the present disclosure.

FIG. 4 is a flow diagram illustrating a method 400 for multi-processing based time series management with pattern detection based forecasting, in accordance with some embodiments of the present disclosure.

At step 402, the method 400 includes allowing the time series management module 210 to receive the plurality of time series from the plurality of data sources such as data sources 106-1 through 106-n. The data sources can be sensors, information generators or the like. At step 404, the method 400 includes allowing the time series management module 210 to store the time series in the repository 112, such as the SQL array in the SQL database or the like. Each time series among the plurality of time series is stored in a single row using the plurality of time series parameters. The plurality of time series parameters may include a start date/time, a frequency of value samples and a plurality of value samples of the plurality of time series corresponding to the frequency. The single row requirement per time series provides a compact storage format, providing memory resource efficient solution for storing high volume data associated with multitude of time series being recorded. Further, the stored time series can be read using the SQL database queries, well known to a general user. Further, the single row format can be read to, for providing customized data requested by the user by providing the aggregator component built on top of the database, which can perform in-memory operations to still achieve higher throughput than traditional database designs for storing and managing time series. The storage format is explained with an example time series in conjunction with FIGS. 5a through 5e.

Once the time series data is stored, at step 406, the method 400 includes allowing the time series management module 210 to analyze the stored plurality of time series on receiving the forecast request from the user. The analysis is performed to identify at least one of the seasonal frequency, the trend property and the seasonality property using the correlation based pattern detection mechanism. The pattern detection mechanism proposed generates the mean series, the seasonal-difference series and the seasonal-ratio series for each series among the stored plurality of time series. Further, for any outliers or missing values present, at step 408, the method 400 includes allowing the time series management module 210 to apply missing value corrections and/or outlier corrections to the stored plurality of time series. The missing value or outlier corrections are applied utilizing the seasonal frequency, the trend property and the seasonality property, wherein the properties are obtained from the analyzed plurality of time series. The corrections provide an updated or treated time series. The pattern detection mechanism provided by the method 400 is explained further in conjunction with FIG. 5f through FIG. 5j. Thus, method provides cost efficient techniques to be used to pre-determine whether the trend property and the seasonality property exist in a time series being analyzed. Further, if the trend property and the seasonality property exist, the pattern detection mechanism proposed can identify whether it is additive or multiplicative in nature.

Further, the missing value interpolation (corrections) and outlier corrections proposed provide due recognition to not just underlying the trend property and the seasonality property but also their additive or multiplicative nature of interaction. Thus, enabling to detect interrelation or interaction between the trend property and the seasonality property. The storing, analysis of the time series and the aggregating or compiling of the time series for customized data requested is explained further in conjunction with FIGS. 5a through 5j with an example time series.

Further, at step 410, the method 400 includes allowing the time series management module 210 to derive the subset of forecasting models from the plurality of pre-stored forecasting models. The subset is derived based on the seasonal frequency, the trend property, the seasonality property, and the plurality of treated time series. The optimum or best-fit forecasting model is then identified from subset to generate one or more forecasted time series in response to the forecast request. The selection of forecasting model, for time series forecasting, from the subset can be performed using existing forecasting model selection mechanisms. The method 400 includes enabling faster convergence on identifying the optimal or best fit forecasting model as the method enables deriving the subset from the plurality of pre-stored forecasting models. Thus, effectively restricting the comparisons for the optimal forecasting model selection to only the identified subset. The subset is derived based on the seasonal frequency, the detected trend property, the detected seasonality property and the updated plurality of time series.

The method 400 includes utilizing multi-core processing for the storing the time series, analyzing the time series and identifying the optimal forecasting model for forecasting one or more time series. The multi-core processing balances overheads involved in creating processes on multiple cores, distributing jobs to each processes and collating run results. Thus, multicore-processing effectively provides time efficient computation of high volume data of the multitude of time series being recorded.

The method steps of analysis of the stored plurality of time series for the trend property and the seasonality property using the correlation based pattern detection, performed at step 406 are provided below.

The method 400 includes applying an Auto Correlation Function (ACF) based first order differencing to each time series among the stored plurality of time series. The ACF based on first order differencing enables to determine whether the seasonal frequency exists for each time series or each time series is to be processed with an ACF based second order differencing. Each time series exhibits an additive property or a multiplicative property for the trend components and seasonal components in each time series. Further, the method 400 includes applying the ACF based second order differencing to each time series to determine the seasonal frequency of each time series if the seasonal frequency is not detected during the ACF based first order differencing. The ACF based second order differencing is applied if series is non-stationary and strong correlations for first lags are observed for each time series being analyzed.

In an embodiment, the seasonal frequency may be identified using a frequency domain analysis method. However, experiments indicate that the above the ACF based approach provides faster seasonal frequency determination.

Further, the method 400 includes generating the mean series from each time series based on the determined seasonal frequency by taking average of each frequency period from initial value (for example, 1) up to the identified seasonal frequency and repeating the pattern to extend over length of an original time series corresponding to the mean series.

Further, the method 400 includes deriving from each time series and the generated mean series of each time series the seasonal—difference series providing a seasonal-difference and the seasonal—ratio series providing a seasonal-ratio by subtracting and dividing respectively each points in the original time series with the mean series. Further, the method 400 includes identifying the seasonality property of each time series based on the derived seasonal-difference and the seasonal-ratio for each time series.

The step of identifying of the seasonality property includes characterizing each time series as having the seasonality property as multiplicative when the seasonal-ratio is uniform. The uniformity indicates reduced noise or no drastic variance change points observed in the series. Further, the step of identifying the seasonality property includes characterizing each time series as having the seasonality property as additive when the seasonal—difference is uniform.

Upon identification of the seasonality property, the method 400 includes identifying a de-seasonalized series by selecting the seasonal difference or the seasonal ratio for each of the plurality of time series. Among the seasonal difference and the seasonal ratio, the one which is uniform is selected. For each time series, the method 400 includes deriving, the trend-difference series and the trend-ratio series from the identified de-seasonalized series. The trend-difference is obtained by subtracting each point in the time series with the preceding point. The trend-ratio is obtained by dividing each point in the time series with the preceding point Further, upon identification of the seasonal property, the method 400 includes characterizing each time series as having the trend property as additive if the trend-difference is uniform. The trend property is characterized as multiplicative if the trend-ratio is more uniform.

The method steps for treating of the stored plurality of time series for the missing value corrections to update the plurality of time series, performed at step 408 of method 400, are provided below:

The method 400 includes applying a polynomial fit on detection of the trend property to derive fitting values as interpolated trend values for missing values of each time series. This enables generating a trend series, wherein the mean value of series is used if the trend property is not detected. Further, the method 400 includes de-trending each time series as per the trend property based on the derived fitting values and ignoring the parts with missing values. The de-trending comprises dividing the trend series from each time series if the trend property is multiplicative and subtracting the trend series from each time series if the trend property is additive. Further, the method 400 includes replacing the missing values by values of each of the time series that lie on forward or backward part of series lying seasonal frequency apart when seasonal property is detected. The mean values of up to 5 points around missing values are used if none of the forward or backward value are detected. Further, the method 400 includes replacing the missing values by the mean value of series if the seasonal property is not detected. Furthermore, the method includes multiplying or adding the resultant series, created post seasonality treatment, to the trend series depending upon the seasonal property. Furthermore, the method 400 includes confirming that all missing values are treated for missing value corrections, wherein above process is repeated, recursively, for any remaining (leftover) missing values.

The method steps for treating of the stored plurality of time series for the outlier corrections to update the plurality of time series based on the analyzed plurality of time series, performed at step 408 of method 400, are provided below.

The method 400 includes utilizing the seasonal frequency to create the mean-series and de-seasonalizing each time series. The absence of seasonality property in each time series being processed indicates the time series is a de-seasonalized series. The de-seasonalizing includes dividing the mean series from the time series if the seasonal property is multiplicative, while subtracting the mean series from the time series if seasonality property is additive. Further, the method 400 includes deriving a de-trended series from the time series by applying a higher order polynomial trend fit, dividing the trend fit from de-seasonalized series if the trend property is multiplicative and subtracting the trend fit from de-seasonalized series if the trend property is additive or not detected. Upon deriving the de-trended series, the method 400 includes applying outlier detection mechanism (for example, Box Plot) on the de-trended series to detect the outliers. The outliers are removed or eliminated based on user input in accordance with an acceptable preset standard deviation. For example, for 90% of the cases a standard deviation value of 2 (i.e. mean +/−2sigma) suffices for treating outliers. This enables creating an outlier corrected series. Further, the method includes re-constructing resultant series from the outlier corrected series by adding or multiplying trend fit to the corrected series as per trend property and adding or multiplying seasonal mean series to the trend corrected series as per seasonal property.

In an embodiment, the method 400 enables compiling a customized data from the stored plurality of time series by the aggregator component built over the SQL database. Thus, on receiving a request for the customized data, the data is compiled by aligning a set of time series from the plurality of time series referred in the request. The alignment is in accordance with corresponding start date/time, wherein non-available dates/time are set to zeroes. Further, the compiling of data includes utilizing SQL database functions to aggregate the time series parameters based on the request. If aggregation is requested across a plurality of series along a time dimension, then, SQL functions handling ordinals of given arrays to aggregate values which are similar to aggregating columns of a matrix or custom functions are created to handle in-memory operations. If aggregation is requested across a plurality of series along other linked attributes of the time series that define the non-temporal characteristic of the time series, then aggregation is performed across the attributes using SQL functions. The function may include GROUP BY or custom functions created for the same to handle in-memory operations.

The illustrated steps of method 400 are set out to explain the exemplary embodiments shown, and it should be anticipated that ongoing technological development may change the manner in which particular functions are performed. These examples are presented herein for purposes of illustration, and not limitation. In an embodiment, the steps of the method 400 can be performed by the time series management system 202 utilizing the time series management module 210.

Figure 5F:
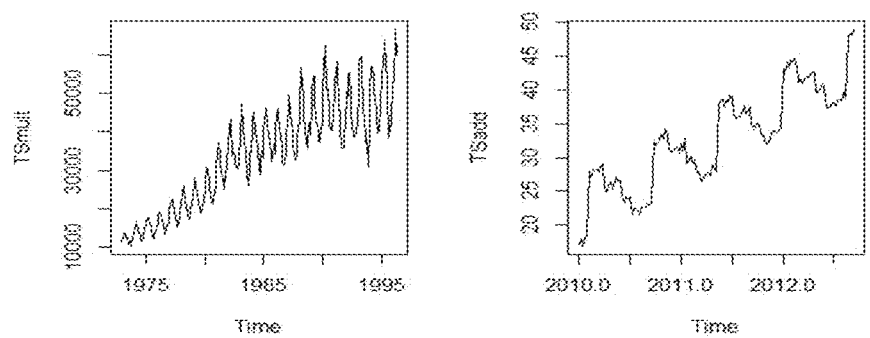

FIGS. 5a through 5j illustrate the multi-core processing based time series management with example time series, in accordance with some embodiments of the present disclosure. The FIGS. 5a and 5b depict three time series that records monthly sales of product1 (AB01DE00001) at store1 (ST02K001), product2 (AB01 DE00002) at store1 product3 (AB01 DE00003) at store1, and product 1 (AB01 DE00001) at store2 (ST02K002) providing raw data of product-store-daily values, which occupies 105 rows for the three time series as depicted in FIG. 5c. However, as depicted in FIG. 5d, the three time series are stored as single row per series. The primary information that a time series typically needs is the starting date, the frequency of value samples and the values themselves. The steps to store the time series data in the proposed storage format of single row includes:

1. Identify the hierarchal level at which the time series is to be prepared, say, to create series of Product-Store-Weekly level when raw data is Product-Store-Daily.
2. From the raw data, for every Product-Store combination sum up all the values for each week and store them as arrays as shown in the FIG. 5d. The start of first week of recorded data becomes the start date and since requirement is to sum weekly, the frequency is set as 52. It would get set to 12 for monthly, 4 for quarterly and 7 for daily. Thus a single time series is stored by compacting the information in the single row of a database.
3. The above steps can be handled in modern relational SQL databases using database specific functions for date manipulation and also SQL Arrays. In an embodiment, the single row storage and reading of the stored row can also be obtained in No-SQL databases using similar functions.

For the example here, the storage format proposed by the method reduce costs by ¼ for all accesses. Once data (time series) is stored in above format as shown in FIG. 5d and the proposed method includes enabling further aggregation of the stored time series (data) as depicted in FIG. 5e using the aggregator component to compile the data per the user request (provides customized data). For example, when the user desires to switch for information from Product-Store-Weekly to Product-Weekly (aggregate product sale across all stores) or, to Product-Store-Monthly (aggregate sales to monthly levels), the aggregator component built above the data base can be configured to perform following steps, typically explained for example here:

1. For any set of time series to be aggregated, align the time series as per their start and end dates as date range, leaving non-available dates as zeroes.
2. The first case of creating Product-Weekly is then easily carried out as array values can be summed up across the product column using regular SQL Group By clause.
3. The second case utilizes SQL database functions like un-nesting array and using the ordinals to group, or custom functions are written to handle the aggregation in memory.

Figure 5G:
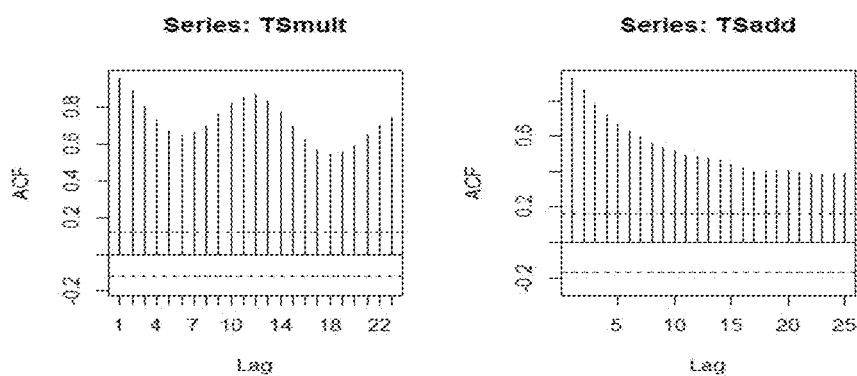

FIG. 5f depicts two example time series, assumed to have multiplicative and additive properties respectively. Thus, analysis is performed to identify the parameters for the time series such as the trend property, the seasonal property, which are further used for missing values corrections, outlier corrections and input to determine optimal forecasting models. Analyzing the stored plurality of time series for the trend property and the seasonality property using the correlation based pattern detection mechanism is described using the example of FIG. 5f. The FIG. 5g depicts usage of Auto Correlation Function (ACF) plot on these time series, which reveals that they need differencing, which in itself can indicate the trend property, also alternatively referred as trend. Thus, post differencing of first order, the ACF indicates seasonality clearly and also helps determine the seasonal frequency. In case no prominent repeating spikes are seen, then no seasonality exists. It is important to identify the seasonal frequency observed in the time series as it may be different from what is been specified as natural frequency for the time series. For example, provide a weekly series with frequency as 52, but patterns repeat every 12 weeks, so the seasonal frequency of 12 has to be used. The seasonal frequency can also be determined by a spectrogram analysis but the correlation method is faster.

Figure 5H:
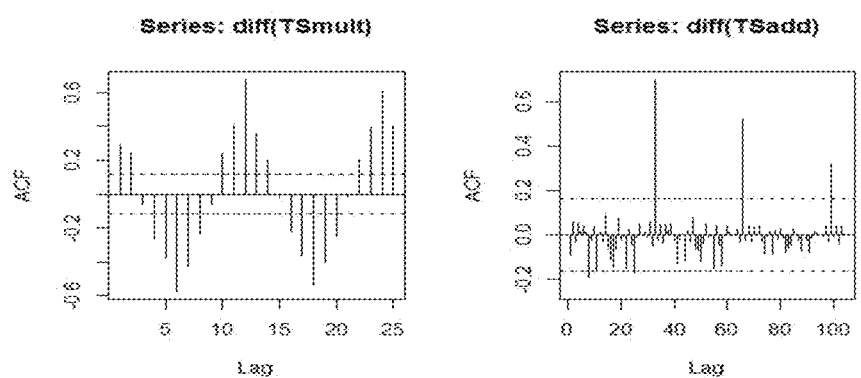
Figure 5I:
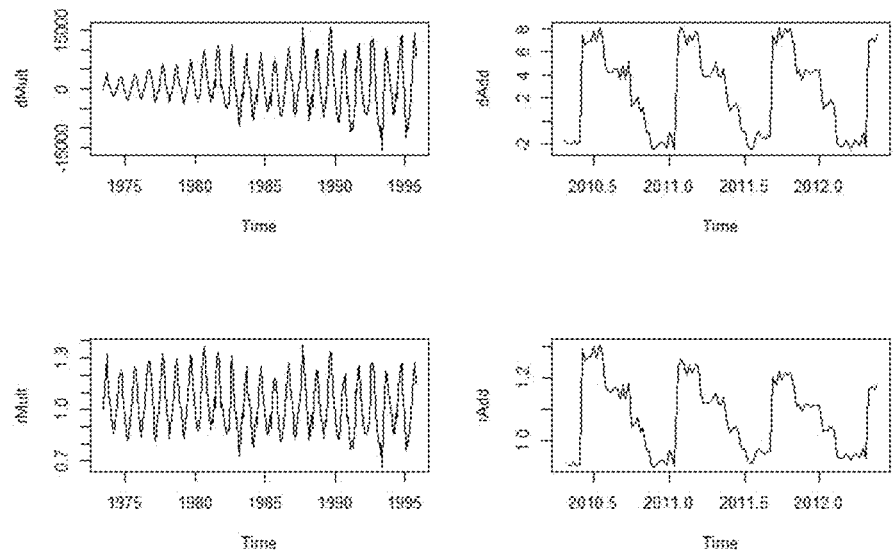

FIG. 5h depicts the second order of differencing. Further, using the above determined seasonal frequency the mean-series is created by taking average of every 1 to nth point where n being the seasonal frequency. The mean-series length is hence n. To determine whether the seasonality is additive or multiplicative two more series from each series above are created. One by taking difference of original and mean-series and the other taking ratio. FIG. 5i depicts the difference and ratio "seasonal" series as created for the multiplicative and additive series. In multiplicative series, the seasonality obtained via ratio operation is more uniform and hence the series has multiplicative seasonality. The reverse holds true in case of additive series.

Figure 5J:
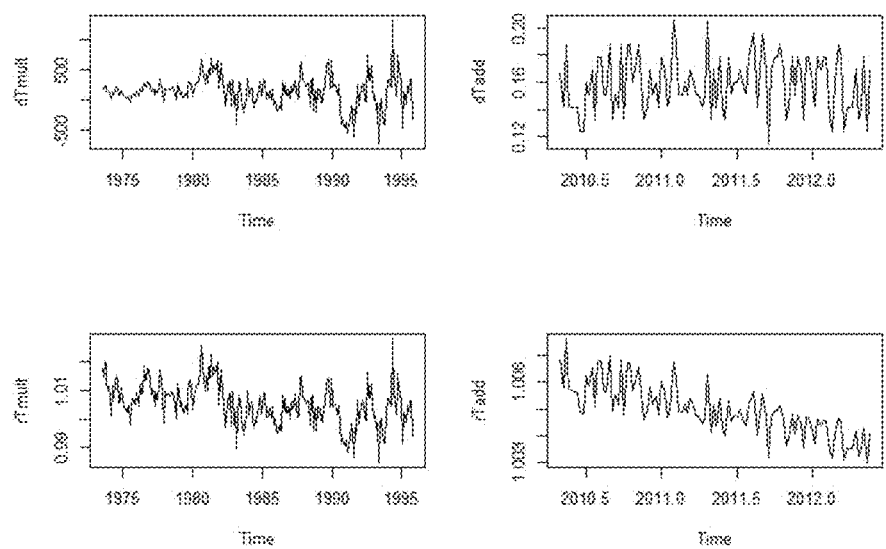

FIG. 5j depicts the difference and ratio "trend" series as created for the de-seasonalized version of original time series. A similar operation performed for de-seasonalized series helps determine the trend property with respect to the underlying level. If trend-difference series is more random than the trend-ratio series, then the trend is additive, else multiplicative.

The pattern detection mechanism provided not only determines the trend and seasonality interaction property of multiplicative and additive, it also helps determine whether or not trend and/or seasonality exist in the series.

For missing value correction, the following steps are followed:

If a series (time series) has missing values, a better interpolation can be determined by the following steps:
  a. If trend is detected, do a polynomial fit (quadratic works in most cases) and use the fitted values as trend values for missing entries, else just use mean value of series.
  b. Using the above, values, de-trend the series as per trend property, if it's multiplicative, divide the trend from original series, else subtract.
  c. If seasonality is detected, then the de-trended series shows repeating pattern, the missing value area is replaced by values from either forward or backward part of series that's seasonal frequency apart. So suppose, there is a monthly series then values from 12 points back or ahead can be used to fill a specific missing value.
  d. Resultant series thus created post seasonality treatment is then either multiplied or added to trend series created above in step 1 depending upon the seasonal property.
  e. The above method of using the trend and seasonal interaction properties is found to be faster and more accurate in interpolating missing values than traditional methods like using medians or using regression methods.

Like for the missing values described above, the outliers can also be treated in a faster and more accurate manner by using the following steps:
  f. Ensure that any missing values are first treated as per method described above.
  g. Use the seasonal frequency to create the mean-series as describe above and use the seasonal interaction property to de-seasonalize original series by either dividing or subtracting the mean series from original.
  h. If there's no seasonality, then original series is considered as the de-seasonalized series.
  i. This de-seasonalized series is fitted with the polynomial order (order of 5 showed highest reliability during experimentation regression line (trend line) and the fitted lines is subtracted or divided from the de-seasonalized series based on Trend interaction. Thus getting the de-trended series.
  j. On the resultant series, Box Plot is applied to detect the outlier points and the outliers are removed based on user input for how much standard deviation can be tolerated.
  k. Outliers corrected by above method is more accurate than traditional method of simply using mean-sigma or much faster than the method of applying regressions and determining outliers on residuals.

The above detection of the trend property and the seasonal property, allows to specify to models that fitment is to be tried for only the subset that matches the properties instead of a complete set of all possible fitments. Few examples are provided below:

1. Exponential smoothing models based on interaction of trend, seasonality and random/noise, end up with up to 30 combinations to try, the Error interaction is included as suggested in known ETS models in. Such methods go about choosing best fit by trying out all 30 combinations and choosing the model based on log-likelihood. By pre-determining the interaction property, the iterations can be reduced to just 2-4 runs instead of 30, giving us a benefit of ~12×–15× m. Arima models take p, d, q orders in additional to seasonal orders of P, D, and Q. In most cases series can take value of 0-5 for p,q,P and Q and values of 0-2 for d and D. Thus, one may land up using 2500 iterations to find the best fit Arima model for a single series. Knowing whether trend and seasonality exist and using ACF and PACF and the determined seasonal frequency, the range of values to be tried for Arima orders can be reduced and iterations reduced to as low as 5-10 iterations, giving a huge improvement in run time while still achieving best fit.

n. In case no trend and seasonality is found, simple moving average models can be selected.

o. Such selections help us achieve best fit model selection in ¼ the time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method providing multi-core processing based time series management with pattern detection based forecasting, the method comprising:

receiving a plurality of time series from a plurality of data sources, wherein each time series among the plurality of time series is stored in a single row as a Structured Query Language (SQL) array;

analyzing the stored plurality of time series on receiving a forecast request, to identify at least one of a seasonal frequency, a trend property and a seasonality property using a correlation based pattern detection mechanism, wherein the correlation based pattern detection mechanism generates a mean series, a seasonal-difference series, a seasonal-ratio series, a trend-difference series and a trend-ratio series for each time series among the plurality of time series, wherein the correlation based pattern detection mechanism comprises:

determining the seasonal frequency for each time series by:

applying an Auto Correlation Function (ACF) based first order differencing to each time series among the stored plurality of time series to determine the seasonal frequency that exists for each time series; or applying an ACF based second order differencing to each time series if seasonal frequency is not determined during the ACF based first order differencing, wherein each time series exhibits an additive property or a multiplicative property for the trend property and the seasonal property in each time series, wherein each time series is non-stationary and strong correlations for first lags are observed for each time series being analyzed;

treating the stored plurality of time series by applying at least one of missing value corrections and outlier corrections; and deriving a subset of forecasting models from a plurality of pre-stored forecasting models based on at least one of the seasonal frequency, the trend property, the seasonality property, and the plurality of treated time series, wherein a forecasting model for time series forecasting is selected from the subset, wherein the storing and the analyzing of the plurality of time series, the deriving of the subset of forecasting models, utilizes multi-core processing to balance overheads involved in creating processes on multiple cores, distributing jobs to each processes and collating run results.

2. The method of claim 1, wherein the correlation based pattern detection mechanism further comprises:

generating the mean series from each time series based on the seasonal frequency by averaging each frequency period from initial value up to the identified seasonal frequency and repeating the pattern to extend over length of an original time series corresponding to the mean series;

deriving from each time series and the generated mean series of each time series the seasonal—difference series providing a seasonal-difference and the seasonal—ratio series providing a seasonal-ratio by subtracting and dividing respectively each points in each time series with the corresponding mean series;

identifying the seasonality property of each time series based on the derived seasonal-difference and the seasonal-ratio for each time series, wherein identifying comprises:

characterizing each time series as having the seasonality property as multiplicative when the seasonal-ratio is uniform, wherein the uniformity indicates reduced noise or no drastic variance change points observed in the series; and characterizing each time series as having the seasonality property as additive when the seasonal difference is uniform; and identifying a de-seasonalized series by selecting the seasonal difference or the seasonal ratio for each of the plurality of time series based on whether one of the seasonal difference and the seasonal ratio is uniform.

3. The method of claim 2, wherein the method further comprises:

deriving for each time series the trend-difference series by subtracting each point in the time series with the preceding point and deriving the trend-ratio series from the identified de-seasonalized series by dividing each point in the time series with the preceding point; and characterizing each time series as having the trend property as additive if the trend-difference is uniform and the trend property as multiplicative if the trend-ratio is more uniform.

4. The method of claim 1, wherein treating the stored plurality of time series for the missing value corrections comprises:

applying a polynomial fit on detection of the trend property to derive fitting values as interpolated trend values for missing values of each time series to generate a trend series, wherein the mean value of series is used if the trend property is not detected;

de-trending each time series as per the trend property based on the derived fitting values and ignoring parts with missing values, wherein de-trending comprises dividing the trend series from each time series if the trend property is multiplicative and subtracting the trend series from each time series if the trend property is additive;

replacing the missing values by values of each of the time series that lie on forward or backward part of series lying seasonal frequency apart when seasonal property is detected, wherein mean values of up to 5 points around missing values are used if none of the forward or backward value are detected;

replacing the missing values by the mean value of series if the seasonal property is not detected;

multiplying or adding resultant series, created post seasonality treatment, to the trend series depending upon the seasonal property; and repeating, recursively, the missing value correction for remaining missing values.

5. The method of claim 1, wherein treating the stored plurality of time series for the outlier corrections comprises:

utilizing the seasonal frequency to create the mean series;

de-seasonalizing each time series, wherein absence of seasonality property in each time series being processed indicates the time series is a de-seasonalized series, wherein de-seasonalizing comprises:

dividing the mean series from the time series if the seasonal property is multiplicative; and subtracting the mean series from the time series if seasonality property is additive;

deriving a de-trended series from the time series by:

applying a higher order polynomial trend fit;

dividing the trend fit from the de-seasonalized series if the trend property is multiplicative; and subtracting the trend fit from the de-seasonalized series if the trend property is additive or not detected;

applying an outlier detection mechanism on the de-trended series to detect outliers, wherein the outliers are eliminated based on user input in accordance with an acceptable preset standard deviation, to create an outlier corrected series; and re-constructing resultant series from the outlier corrected series by:

adding or multiplying trend fit to the corrected series as per trend property; and adding or multiplying seasonal mean series to the trend corrected series as per seasonal property.

6. The method of claim 1, wherein the method comprises compiling a customized data from the stored plurality of time series by an aggregator component built over SQL database on receiving a request for the customized data, wherein the compiling of the customized data comprises:

aligning a set of time series from the plurality of time series referred in the request in accordance with corresponding start date/time, wherein non-available dates/time are set to zeroes; and utilizing the SQL database functions to aggregate time series parameters based on the request to compile the customized data, wherein:

if aggregation is requested across a plurality of series along a time dimension, then, SQL functions handling ordinals of given arrays to aggregate values which are similar to aggregating columns of a matrix or custom functions are created to handle in-memory operations; and if aggregation is requested across a plurality of series along other linked attributes of the time series that define non-temporal characteristic of the time series, then aggregation is performed across the attributes using SQL functions.

7. A system for providing multi-core processing based time series management with pattern detection based forecasting, wherein the system comprises a memory operatively coupled to one or more hardware processors and configured to store instructions configured for execution by the one or more hardware processors, further the system comprises:
a time series management module configured to:
receive a plurality of time series from a plurality of data sources, wherein each time series among the plurality of time series is stored in a single row as a Structured Query Language (SQL) array;
analyze the stored plurality of time series on receiving a forecast request, to identify at least one of a seasonal frequency, a trend property and a seasonality property using a correlation based pattern detection mechanism, wherein the correlation based pattern detection mechanism generates a mean series, a seasonal-difference series, a seasonal-ratio series, a trend-difference series and a trend-ratio series for each series among the stored plurality of time series, wherein the correlation based pattern detection mechanism comprises:
determining the seasonal frequency for each time series by:
applying an Auto Correlation Function (ACF) based first order differencing to each time series among the stored plurality of time series to determine the seasonal frequency that exists for each time series; or
applying an ACF based second order differencing to each time series if seasonal frequency is not determined during the ACF based first order differencing, wherein each time series exhibits an additive property or a multiplicative property for the trend property and the seasonal property in each time series, wherein each time series is non-stationary and strong correlations for first lags are observed for each time series being analyzed;
treat the stored plurality of time series by applying at least one of missing value corrections and outlier corrections; and
derive a subset of forecasting models from a plurality of pre-stored forecasting models based on at least one of the seasonal frequency, the trend property, the seasonality property, and the plurality of treated time series, wherein a forecasting model for time series forecasting is selected from the subset, wherein the storing and the analyzing of the plurality of time series, the deriving of the subset of forecasting models, utilizes multi-core processing to balance overheads involved in creating processes on multiple cores, distributing jobs to each processes and collating run results.

8. The system of claim 7, wherein the time series management module is configured to analyze the stored plurality of time series for identifying the seasonal frequency, the trend property and the seasonality property using the correlation based pattern detection mechanism by:
generating the mean series from each time series based on the determined seasonal frequency by averaging each frequency period from initial value up to the identified seasonal frequency and repeating the pattern to extend over length of an original time series corresponding to the mean series;
deriving from each time series and the generated mean series of each time series the seasonal—difference series providing a seasonal-difference and the seasonal—ratio series providing a seasonal-ratio by subtracting and dividing respectively in each time series with the corresponding mean series;
identifying the seasonality property of each time series based on the derived seasonal-difference and the seasonal-ratio for each time series, wherein identifying comprises:
characterizing each time series as having the seasonality property as multiplicative when the seasonal-ratio is uniform, wherein the uniformity indicates reduced noise or no drastic variance change points observed in the series; and
characterizing each time series as having the seasonality property as additive when the seasonal difference is uniform; and
identifying a de-seasonalized series by selecting the seasonal difference or the seasonal ratio for each of the plurality of time series based on whether one of the seasonal difference and the seasonal ratio is uniform.

9. The system of claim 8, wherein the time series management module is further configured to analyze the stored plurality of time series for identifying the seasonal frequency, the trend property and the seasonality property using the correlation based pattern detection mechanism by:
deriving for each time series the trend-difference series by subtracting each point in the time series with the preceding point and deriving the trend-ratio series from the identified de-seasonalized series by dividing each point in the time series with the preceding point; and
characterizing each time series as having the trend property as additive if the trend-difference is uniform and the trend property as multiplicative if the trend-ratio is more uniform.

10. The system of claim 7, wherein the time series management module is further configured to treat the stored plurality of time series for the missing value corrections by:
applying a polynomial fit on detection of the trend property to derive fitting values as interpolated trend values for missing values of each time series among the plurality of time series to generate a trend series, wherein the mean value of series is used if the trend property is not detected;
de-trending each time series as per the trend property based on the derived fitting values and ignoring parts with missing values, wherein de-trending comprises dividing the trend series from each time series if the trend property is multiplicative and subtracting the trend series from each time series if the trend property is additive;
replacing the missing values by values of each of the time series that lie on forward or backward part of series lying seasonal frequency apart when seasonal property is detected, wherein mean values of up to 5 points around missing values are used if none of the forward or backward value are detected;
replacing the missing values by the mean value of series if the seasonal property is not detected;
multiplying or adding resultant series, created post seasonality treatment, to the trend series depending upon the seasonal property; and repeating, recursively, the missing value correction for remaining missing values.

11. The system of claim 7, wherein the time series management module is configured to treat the stored plurality of time series for the outlier corrections by:
utilizing the seasonal frequency to create the mean series;
de-seasonalizing each time series, wherein absence of seasonality property in each time series being processed indicates the time series is a de-seasonalized series, wherein de-seasonalizing comprises:
dividing the mean series from the time series if the seasonal property is multiplicative; and
subtracting the mean series from the time series if seasonality property is additive;
deriving a de-trended series from the time series by:
applying a higher order polynomial trend fit;
dividing the trend fit from the de-seasonalized series if the trend property is multiplicative; and
subtracting the trend fit from the de-seasonalized series if the trend property is additive or not detected;
applying an outlier detection mechanism on the de-trended series to detect outliers, wherein the outliers are eliminated based on user input in accordance with an acceptable preset standard deviation, to create an outlier corrected series; and
re-constructing resultant series from the outlier corrected series by:
adding or multiplying trend fit to the corrected series as per trend property; and
adding or multiplying seasonal mean series to the trend corrected series as per seasonal property.

12. The system of claim 7, wherein the time series management module is configured to compile a customized data from the stored plurality of time series by an aggregator component built over SQL database on receiving a request for the customized data, wherein the compiling of the customized data by:
aligning a set of time series from the plurality of time series referred in the request in accordance with corresponding start date/time, wherein non-available dates/time are set to zeroes; and
utilizing the SQL database functions to aggregate time series parameters based on the request to compile the customized data, wherein:
if aggregation is requested across a plurality of series along a time dimension, then, SQL functions handling ordinals of given arrays to aggregate values which are similar to aggregating columns of a matrix or custom functions are created to handle in-memory operations; and
if aggregation is requested across a plurality of series along other linked attributes of the time series that define non-temporal characteristic of the time series, then aggregation is performed across the attributes using SQL functions.

13. A non-transitory computer readable medium storing instructions, which, when executed by a hardware processor, cause the hardware processor to perform steps comprising:
receiving a plurality of time series from a plurality of data sources, wherein each time series among the plurality of time series is stored in a single row as a Structured Query Language (SQL) array;
analyzing the stored plurality of time series on receiving a forecast request, to identify at least one of a seasonal frequency, a trend property and a seasonality property using a correlation based pattern detection mechanism, wherein the correlation based pattern detection mechanism generates a mean series, a seasonal-difference series, a seasonal-ratio series, a trend-difference series and a trend-ratio series for each time series among the plurality of time series, wherein the correlation based pattern detection mechanism comprises:
determining the seasonal frequency for each time series by:
applying an Auto Correlation Function (ACF) based first order differencing to each time series among the stored plurality of time series to determine the seasonal frequency that exists for each time series; or
applying an ACF based second order differencing to each time series if seasonal frequency is not determined during the ACF based first order differencing, wherein each time series exhibits an additive property or a multiplicative property for the trend property and the seasonal property in each time series, wherein each time series is non-stationary and strong correlations for first lags are observed for each time series being analyzed;
treating the stored plurality of time series by applying at least one of missing value corrections and outlier corrections; and
deriving a subset of forecasting models from a plurality of pre-stored forecasting models based on at least one of the seasonal frequency, the trend property, the seasonality property, and the plurality of treated time series, wherein a forecasting model for time series forecasting is selected from the subset, wherein the storing and the analyzing of the plurality of time series, the deriving of the subset of forecasting models, utilizes multi-core processing to balance overheads involved in creating processes on multiple cores, distributing jobs to each processes and collating run results.

14. The non-transitory medium of claim 13, wherein analyzing the stored plurality of time series for identifying the seasonal frequency, the trend property and the seasonality property using the correlation based pattern detection mechanism comprises:
generating the mean series from each time series based on the seasonal frequency by averaging each frequency period from initial value up to the identified seasonal frequency and repeating the pattern to extend over length of an original time series corresponding to the mean series;
deriving from each time series and the generated mean series of each time series the seasonal—difference series providing a seasonal-difference and the seasonal—ratio series providing a seasonal-ratio by subtracting and dividing respectively each points in each time series with the corresponding mean series;
identifying the seasonality property of each time series based on the derived seasonal-difference and the seasonal-ratio for each time series, wherein identifying comprises:
characterizing each time series as having the seasonality property as multiplicative when the seasonal-ratio is uniform, wherein the uniformity indicates reduced noise or no drastic variance change points observed in the series; and
characterizing each time series as having the seasonality property as additive when the seasonal difference is uniform; and
identifying a de-seasonalized series by selecting the seasonal difference or the seasonal ratio for each of the plurality of time series based on whether one of the seasonal difference and the seasonal ratio is uniform.

15. The non-transitory medium of claim 14, wherein the actions further comprise:
deriving for each time series the trend-difference series by subtracting each point in the time series with the preceding point and deriving the trend-ratio series from the identified de-seasonalized series by dividing each point in the time series with the preceding point; and
characterizing each time series as having the trend property as additive if the trend-difference is uniform and the trend property as multiplicative if the trend-ratio is more uniform.

16. The non-transitory medium of claim 15, wherein treating the stored plurality of time series for the missing value corrections comprises:
applying a polynomial fit on detection of the trend property to derive fitting values as interpolated trend values for missing values of each time series to generate a trend series, wherein the mean value of series is used if the trend property is not detected;
de-trending each time series as per the trend property based on the derived fitting values and ignoring parts with missing values, wherein de-trending comprises dividing the trend series from each time series if the trend property is multiplicative and subtracting the trend series from each time series if the trend property is additive;
replacing the missing values by values of each of the time series that lie on forward or backward part of series lying seasonal frequency apart when seasonal property is detected, wherein mean values of up to 5 points around missing values are used if none of the forward or backward value are detected;
replacing the missing values by the mean value of series if the seasonal property is not detected;
multiplying or adding resultant series, created post seasonality treatment, to the trend series depending upon the seasonal property; and
repeating, recursively, the missing value correction for remaining missing values.

17. The non-transitory medium of claim 14, wherein treating the stored plurality of time series for the outlier corrections comprises:
utilizing the seasonal frequency to create the mean series;
de-seasonalizing each time series, wherein absence of seasonality property in each time series being processed indicates the time series is a de-seasonalized series, wherein de-seasonalizing comprises:
dividing the mean series from the time series if the seasonal property is multiplicative; and
subtracting the mean series from the time series if seasonality property is additive;
deriving a de-trended series from the time series by:
applying a higher order polynomial trend fit;
dividing the trend fit from the de-seasonalized series if the trend property is multiplicative; and
subtracting the trend fit from the de-seasonalized series if the trend property is additive or not detected;
applying an outlier detection mechanism on the de-trended series to detect outliers, wherein the outliers are eliminated based on user input in accordance with an acceptable preset standard deviation, to create an outlier corrected series; and
re-constructing resultant series from the outlier corrected series by:
adding or multiplying trend fit to the corrected series as per trend property; and
adding or multiplying seasonal mean series to the trend corrected series as per seasonal property.

18. The non-transitory medium of claim 13, wherein the method comprises compiling a customized data from the stored plurality of time series by an aggregator component built over SQL database on receiving a request for the customized data, wherein the compiling of the customized data comprises:
aligning a set of time series from the plurality of time series referred in the request in accordance with corresponding start date/time, wherein non-available dates/time are set to zeroes; and
utilizing the SQL database functions to aggregate time series parameters based on the request to compile the customized data, wherein:
if aggregation is requested across a plurality of series along a time dimension, then, SQL functions handling ordinals of given arrays to aggregate values which are similar to aggregating columns of a matrix or custom functions are created to handle in-memory operations; and
if aggregation is requested across a plurality of series along other linked attributes of the time series that define non-temporal characteristic of the time series, then aggregation is performed across the attributes using SQL functions.

* * * * *